United States Patent
Cho et al.

(10) Patent No.: US 7,274,517 B2
(45) Date of Patent: Sep. 25, 2007

(54) MICROMIRROR ARRAY LENS WITH FOCAL LENGTH GRADIENT

(75) Inventors: Gyoung Il Cho, Seoul (KR); Cheong Soo Seo, Seoul (KR); Sang Hyune Baek, Suwon (KR)

(73) Assignees: Angstrom, Inc., Suwon (KR); Stereo Display, Inc., Anaheim, CA (US)

( * ) Notice: Subject to any disclaimer, the term of this patent is extended or adjusted under 35 U.S.C. 154(b) by 111 days.

(21) Appl. No.: 11/076,616

(22) Filed: Mar. 10, 2005

(65) Prior Publication Data
US 2006/0203358 A1 Sep. 14, 2006

(51) Int. Cl.
*G02B 17/00* (2006.01)
(52) U.S. Cl. .................. 359/726; 359/291; 359/290
(58) Field of Classification Search .............. 359/290, 359/223, 224, 726, 727, 738, 739, 740
See application file for complete search history.

(56) References Cited
U.S. PATENT DOCUMENTS 6,885,819 B2* 4/2005 Shinohara ............... 396/127
2004/0246362 A1* 12/2004 Konno ..................... 348/335
2005/0024736 A1* 2/2005 Bakin et al. .............. 359/663

OTHER PUBLICATIONS

Boyd, Fast-response Variable Focusing Micromirror Array Lens 2003, Smart Structures and Materials 2003; smart Electronics, MEMS, BioMEMS and Nanotechnology, SPIE vol. 5055(2003).*

* cited by examiner

*Primary Examiner*—Timothy Thompson

(57) ABSTRACT

An optical system includes a refractive lens system and a micromirror array lens with angled positioning to improve light efficiency. The micromirror array lens is optically coupled to the refractive lens system, and has a focal length gradient. The micromirror array lens is configured to focus the light input refracted by the micromirror array lens onto a focal plane, the micromiror array lens is positioned at an acute angle with respect to the light input and the focal plane. The optical system may further include an infrared filter and/or an optical stop to block unwanted light. The advantages of the present invention include improved light efficiency, image quality, and/or focusing.

14 Claims, 2 Drawing Sheets

MICROMIRROR ARRAY LENS WITH FOCAL LENGTH GRADIENT

BACKGROUND OF THE INVENTION

Micromirror array lenses (MMAL) may be used in various types of optical devices, such as for example, imaging and display devices. However, because light rays are reflected according to the direction of the incident angle, to separate light input from light output of the MMAL and to deflect outgoing light to its intended direction, while not blocking incoming light, a beam splitter must be placed in the optical path. Use of the beam splitter makes the optical system more complex and degrades light efficiency, because in each path of the beam splitter, 50% of the light input is lost and while the other light input passes through the beam splitter twice.

FIG. 1 depicts a prior art optical system 100 using a micromirror array lens 103. The optical system includes a conventional refractive lens system 101, and a beam splitter 102 optically coupled to the conventional refractive lens system 101. The micromirror array lens 103 is optically coupled to the beam splitter 102. A focal plane 104 is optically coupled to the beam splitter 102. The focal plane 104 may be, for example, an image sensor or screen. Note that fifty percent of incident beams 105 are lost, as indicated by lost beams 106 and 107. Thus, 75% of the light is lost, causing the resultant image to appear dim.

Therefore, what is needed is an optical system using a micromirror array lens that provides improved light efficiency.

SUMMARY OF INVENTION

The present invention addresses the problems of the prior art and provides a micromirror array lens (MMAL) with a focal length gradient. The following U.S. patent applications describe micromirrors and micromirror array lens: U.S. patent application Ser. No. 10/806,299, now U.S. Pat. No. 7,057,826 filed Mar. 23, 2004; U.S. patent application Ser. No. 10/822,414, now U.S. Pat. No. 7,086,416 filed Apr. 12, 2004; U.S. patent application Ser. No. 10/855,715, now U.S. Pat. No. 7,031,046 filed May 27, 2004; U.S. patent application Ser. No. 10/855,287, now U.S. Pat. No. 6,934,072 filed May 27, 2004; U.S. patent application Ser. No. 10/857,714, now U.S. Pat. No. 7,161,729 filed May 28, 2004; US patent application Ser. No. 10/893,039, filed Jul. 16, 2004; and U.S. patent application Ser. No. 10/896,146, now U.S. Pat. No. 7,215,882 filed Jul. 20, 2004, all of which disclosures are hereby incorporated by reference.

In one embodiment of the present invention, an optical system using a micromirror array lens with angled positioning to improve light efficiency is presented. The optical system includes a refractive lens system and a micromirror array lens. The micromirror array lens is optically coupled to the refractive lens system, and has a focal length gradient. The micromirror array lens is configured to focus the light input refracted by the micromirror array lens onto a focal plane. For focusing the micromirror array lens onto the focal plane, the micromiror array lens is positioned at an acute angle with respect to the light input and the focal plane.

In another embodiment of the present invention, the optical system may include an infrared filter, optically coupled to the micromirror array lens and the focal plane. The infrared filter is configured to filter the infrared light focused from the micromirror array lens onto the focal planes. The focal plane may be an image sensor. The optical system may also include an optical stop that is configured to block unwanted light.

In still another embodiment of the present invention, an optical system includes a refractive lens system, configured to refract light input, and a micromirror array lens having a plurality of micromirrors. The micromirror array lens is optically coupled to the refractive lens system, and has a focal length gradient. The micromirror array lens is configured to focus the light input refracted by the micromirror array lens onto a focal plane. For focusing the micromirror array lens onto the focal plane, the micromiror array lens is positioned at an acute angle with respect to the light input and the focal plane. The micromirrors of the micromirror array lens are oriented to provide a plurality of focal lengths from the micromirror array lens.

In yet another embodiment of the present invention, an optical system includes a refractive lens system, configured to refract light input, and a micromirror array lens. The micromirror array lens is optically coupled to the refractive lens system. The micromirror array lens is configured to focus the light input refracted by the micromirror array lens onto a focal plane. The micromiror array lens is positioned at an acute angle with respect to the light input and configured to have a focal length gradient. The embodiment may further include an infrared filter and/or an optical stop.

Those skilled in the art will appreciate that the embodiments of the present invention may provide auto-focusing.

The advantages of the present invention include improved light efficiency, image quality, and/or focusing.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

A micromirror array lens (MMAL) is a reflective type lens. To avoid beam loss, rather than using a beam splitter, the MMAL may be positioned at an angle with respect to light input. For example, the MMAL may be positioned at an acute angle, such as for example, a forty-five degree angle, with respect to the light input. Other angles are also possible. By angled positioning of the MMAL, light efficiency may be greatly improved. However, angled positioning of the MMAL with respect to incident light may make it difficult to properly focus on a focal plane if the MMAL has only a single focal length. This may result in lower image quality in an imaging device. However, by changing the attitude of each micromirror in the MMAL slightly, a focal length gradient is produced across the reflective surface of the MMAL, yielding improved light efficiency, image quality and/or focusing.

Figure 1:
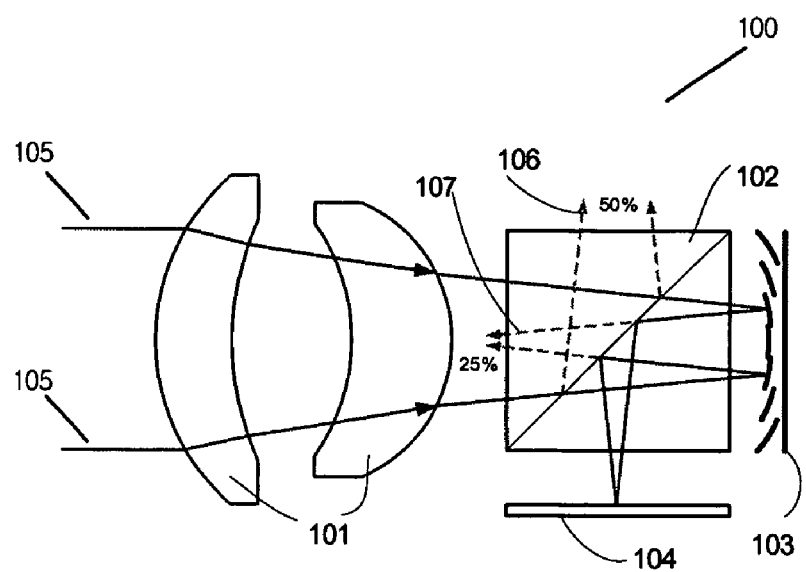
FIG. 1 depicts a prior art optical system using a micromirror array lens.
Figure 2:
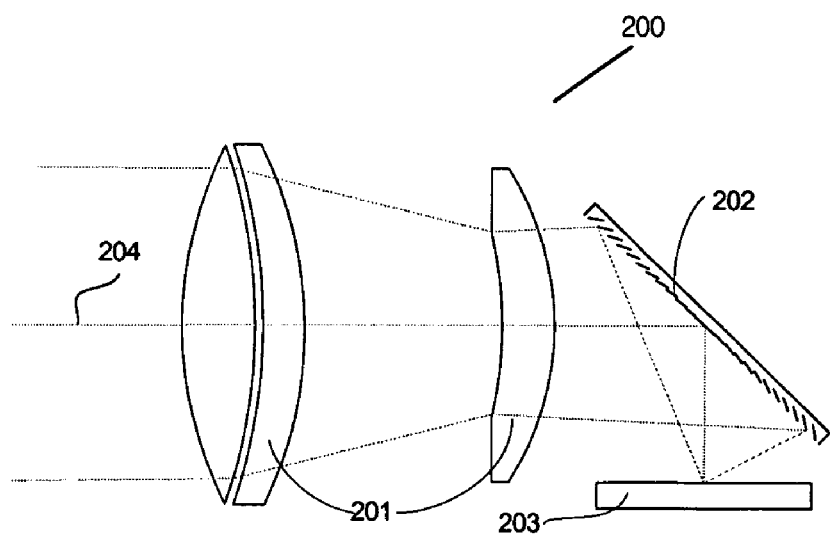
FIG. 2 depicts an optical system using a micromirror array lens with angled positioning to improve light efficiency, according to an embodiment of the invention.

FIG. 2 depicts an optical system 200 using a micromirror array lens 202 with angled positioning to improve light efficiency, according to an embodiment of the invention. In the embodiment depicted in FIG. 2, the optical system 200 includes a refractive lens system 201, configured to refract light input 204. The optical system 200 also includes a micromirror array lens 202, optically coupled to the refractive lens system 201, configured to focus the light input 204 refracted by the micromirror array lens 202 onto a focal plane 203. The micromirror array lens 202 is positioned at an acute angle with respect to the light input 204 and the focal plane 203. In one embodiment, the focal plane 203 includes an image sensor. In another embodiment, the focal plane 203 includes a screen. As stated above, angled positioning of the micromirror array lens 202 may improve light efficiency.

Figure 3:
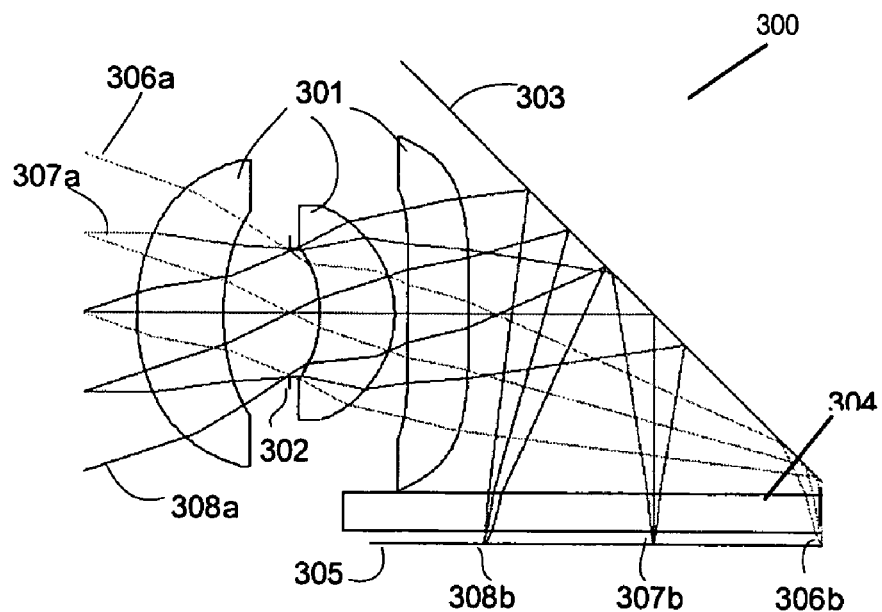
FIG. 3 depicts an optical system using a micromirror array lens with angled positioning in an auto-focusing application, according to an embodiment of the invention.

FIG. 3 depicts an optical system 300 using a micromirror array lens 303 with angled positioning in an auto-focusing application, according to an embodiment of the invention. In the embodiment depicted in FIG. 3, the optical system 300 is configured to provide auto-focusing. In the embodiment, the optical system 300 includes an infrared filter 304, optically coupled to the micromirror array lens 303 and the focal plane 305, configured to filter infrared light focused from the micromirror array lens 303 onto the focal plane 305. The focal plane 305 may be, for example, an image sensor. The optical system also includes a refractive lens system 301. The refractive lens system 301 includes an optical stop 302, configured to block unwanted light.

In the optical system 300, light beams (light input) with different incident angles are reflected at different positions of the micromirror array lens 303 and are focused at different positions on the focal plane 305, as shown in FIG. 3. Light beam 306a is an incident beam from a negative field. Focus 306b is the focus point of the light beam 306a. Light beam 307a is an incident beam from a zero field. Focus 307b is the focus point of the light beam 307a. Light beam 308a is an incident beam from a positive field. Focus 308b is the focus point of the light beam 308a.

Figure 4:
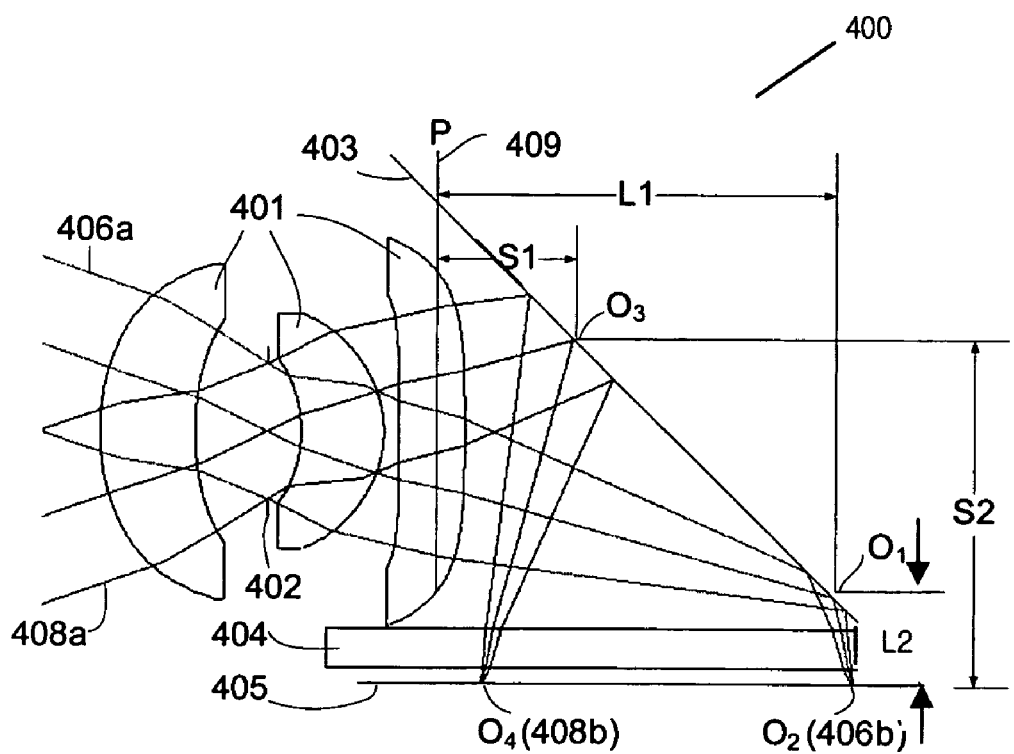
FIG. 4 depicts an optical system using a micromirror array lens with a focal length gradient, according to an embodiment of the invention.

FIG. 4 depicts an optical system 400 using a micromirror array lens 403 with a focal length gradient, according to an embodiment of the invention. In the embodiment, the optical system 400 includes a refractive lens system 401. The refractive lens system 401 includes an optical stop 402. The optical system 400 also includes the micromirror array lens 403, an infrared filter 404, and a focal plane 405. The focal plane 405 may include, for example, an image sensor. Light beam 406a is an incident beam from a negative field. Focus 406b is the focus point of the light beam 406a. Light beam 408a is an incident beam from a positive field. Focus 408b is the focus point of the light beam 408a. Plane 409 is the rear principal plane of the refractive lens system 401.

Considering the two lenses depicted in FIG. 4, that is, the refractive lens system 401 and the micromirror array lens 403, the optical system 400 may be viewed as a combination of the two lenses. From the lens formula, the combined focal length of the two lenses is represented by the following formula:

$$f = \frac{f_2(f_1 - d)}{f_1 + f_2 - d} + d$$

where $f_1$ is the focal length of the refractive lens system, $f_2$ is the focal length of a MMAL, f is the combined focal length of the two lenses, and d is the distance between the two lenses.

In the embodiment depicted in FIG. 4, $f_1$ and f are fixed, and f corresponds to (L1+L2) or (S1+S2). S1 is the distance from the principal plane 409 to $O_3$, S2 is the distance from $O_3$ to $O_4$, L1 is the distance from the principal plane 409 to $O_1$, and L2 is the distance from $O_1$ to $O_2$. d corresponds to S1 for the positive field light beam 408a, and to L1 for the negative field light beam 406b. Thus:

$$f=L1+L2=S1+S2$$

and, therefore, using the above lens equation:

$$f_2 = \frac{(f_1 - d)(f - d)}{f_1 - f}$$

For two beams:

$$f_2 = \frac{(f_1 - d)(f - S1)}{f_1 - f} \text{ (for the positive field light beams (408a))}$$

$$f_2 = \frac{(f_1 - d)(f - L1)}{f_1 - f} \text{ (for the negative field light beams (406a))}$$

Hence, to make the focus points 408b, 406b lie on the same focal plane 405, corresponding positions on the micromirror array lens 403 have different focal lengths. Considering all possible beams from all solid angles of field of view (FOV), the focal length of each position on the micromirror array lens 403 must change gradually. As described by the reference of U.S. patent application Ser. No. 10/855,287, filed May 27, 2004, any type of lens can be made by controlling the attitude of each micromirror in the micromirror array lens. Therefore, micromirror array lens 403 with focal length gradient can also be made. A focal length gradient across the reflective surface of the micromirror array lens 403 is thereby produced, yielding improved light efficiency, image quality and/or focusing. The nominal focal length of the micromirror array lens 403 corresponds to the focal length of the center of the micromirror array lens 403.

In one embodiment, an optical system includes a refractive lens system, configured to refract light input. The optical system also includes a micromirror array lens, optically coupled to the refractive lens system, configured to focus the light input refracted by the micromirror array lens onto a focal plane. The micromirror array lens is positioned at an acute angle with respect to the light input. Micromirrors of the micromirror array lens are oriented to provide a plurality of focal lengths from the micromirror array lens.

In another embodiment, an optical system includes a refractive lens system, configured to refract light input. The optical system also includes a micromirror array lens, optically coupled to the refractive lens system, configured to focus the light input refracted by the micromirror array lens onto a focal plane. The micromirror array lens is positioned at an acute angle with respect to the light input and is configured to have a focal length gradient.

In one embodiment, the optical system includes an infrared filter, optically coupled to the micromirror array lens and the focal plane, configured to filter infrared light focused from the micromirror array lens onto the focal plane. In another embodiment, the refractive lens system includes an optical stop, configured to block unwanted light.

In yet another embodiment, the focal plane is an image sensor, or any other type of focal plane. In still another embodiment, the optical system is configured to provide auto-focusing capabilities.

It shall be understood by one skilled in the art that the various aspects and embodiments described herein may be used alone or in combination. The advantages of the present invention include improved light efficiency, image quality, and/or focusing.

While the invention has been shown and described with reference to different embodiments thereof, it will be appreciated by those skills in the art that variations in form, detail, compositions and operation may be made without departing from the spirit and scope of the invention as defined by the accompanying claims.

What is claimed is:

1. An optical system, comprising:
   a refractive lens system, configured to refract light input; and
   a micromirror array lens, optically coupled to the refractive lens system, comprising a plurality micromirrors, wherein each micromirror is independently controlled by actuating components and has two degrees of freedom rotation and one degree of freedom translation motion to adjust focal length of the micromirror array lens having a focal length gradient and to remove phase aberration from an image;
   wherein the micromirror array lens is configured to focus the light input onto a focal plane.

2. The optical system of claim 1, wherein micromirrors of the micromirror array lens are oriented to provide a plurality of focal lengths from the micromirror array lens while satisfying same phase condition and converging condition.

3. The optical system of claim 1, wherein the micromirror array lens is positioned at an acute angle with respect to the light input.

4. The optical system of claim 1, further comprising an infrared filter, optically coupled to the micromirror array lens and the focal plans, configured to filter infrared light focused from the micromirror array lens onto the focal plane.

5. The optical system of claim 1, wherein the refractive lens system further comprises an optical stop, configured to block unwanted light.

6. The optical system of claim 1, wherein the focal plane is an image sensor.

7. The optical system of claim 1, wherein the optical system is configured to provide auto-focusing.

8. The optical system of claim 4, wherein the optical system is configured to provide auto-focusing.

9. An optical system, comprising:
   a refractive lens system, configured to refract light input; and
   a micromirror array lens having a plurality of micromirrors, optically coupled to the refractive lens system, configured to focus the light input onto a focal plane, the micromirror array lens positioned at an acute angle with respect to the light input, and micromirrors of the micromirror array lens oriented to provide a plurality of focal lengths from the micromirror array lens;
   wherein the micromirror array lens comprising a plurality of micromirrors and each micromirror in the micromirror array lens is independently controlled by actuating components and has two degrees of freedom rotation and one degree of freedom translation motion to adjust focal length of the micromirror array lens while satisfying phase matching and converging conditions.

10. The optical system of claim 9, further comprising an infrared filter, optically coupled to the micromirror array lens and the focal plane, configured to filter infrared light focused from the micromirror array lens onto the focal plane.

11. The optical system of claim 9, wherein the refractive lens system further comprises an optical stop, configured to block unwanted light.

12. The optical system of claim 9, wherein the focal plane is an image sensor.

13. The optical system of claim 9, wherein the optical system is configured to provide auto-focusing.

14. The optical system of claim 13, wherein the focal plane includes an image sensor.

* * * * *